(12) United States Patent
Varga

(10) Patent No.: US 10,425,328 B2
(45) Date of Patent: *Sep. 24, 2019

(54) LOAD DISTRIBUTION ARCHITECTURE FOR PROCESSING TUNNELLED INTERNET PROTOCOL TRAFFIC

(71) Applicant: Telefonaktiebolaget LM Ericsson (publ), Stockholm (SE)

(72) Inventor: Tamás Varga, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

This patent is subject to a terminal disclaimer.

(21) Appl. No.: 15/250,994

(22) Filed: Aug. 30, 2016

(65) Prior Publication Data

US 2016/0373350 A1 Dec. 22, 2016

Related U.S. Application Data

(63) Continuation of application No. 13/811,318, filed as application No. PCT/EP2010/004999 on Aug. 13, 2010, now Pat. No. 9,461,912.

(51) Int. Cl.
*G06F 15/16* (2006.01)
*H04L 12/721* (2013.01)
(Continued)

(52) U.S. Cl.
CPC .......... *H04L 45/70* (2013.01); *H04L 12/4633* (2013.01); *H04L 43/028* (2013.01);
(Continued)

(58) Field of Classification Search
CPC ............. H04L 67/1002; H04L 67/1004; H04L 67/1006; H04L 67/1008; H04L 67/101;
(Continued)

(56) References Cited

U.S. PATENT DOCUMENTS 7,590,725 B1    9/2009 Harrison
7,606,229 B1 * 10/2009 Foschiano ........... H04L 12/4641
                                                          370/392
(Continued)

OTHER PUBLICATIONS

Colajanni, M. et al., "A Parallel Architecture for Stateful Intrusion Detection in High Traffic Networks", IEEE/IST Workshop on Monitoring, Attack Detection and Mitigation, Sep. 2006,Tubingen, Germany, [Retrieved on Jan. 16, 2013], Retrieved from the internet: http://www.academia.edu/189237/A_Parallel_Architecture_for_Stateful_Intrusion_Detection_in_High_Traffic_Networks.

(Continued)

*Primary Examiner* — Dhairya A Patel
(74) *Attorney, Agent, or Firm* — Sage Patent Group

(57) ABSTRACT

A device receives Ethernet based tunnelled Internet Protocol (IP) traffic transmitted from a first network node towards a second network node of an IP communications network. The Ethernet based tunnelled IP traffic comprises an Ethernet based tunnelled IP packet that comprises a header and a payload. The header contains a destination Ethernet address and the payload contains an inner user IP header of an inner user IP packet. An Ethernet Switch modifies the destination Ethernet address contained in the header of the Ethernet based tunnelled IP packet based on the inner user IP header. One PU is selected, from the plurality of PUs, for traffic analysis of a data session comprising the Ethernet based tunnelled IP traffic. The Ethernet based tunnelled IP packet is to be redirected to the selected PU in accordance with the modified destination Ethernet address.

16 Claims, 10 Drawing Sheets

(51) Int. Cl.
*H04L 12/46* (2006.01)
*H04L 12/26* (2006.01)
*H04L 12/803* (2013.01)
*H04L 29/06* (2006.01)
*H04L 29/08* (2006.01)
*H04L 12/823* (2013.01)

(52) U.S. Cl.
CPC ............ *H04L 43/12* (2013.01); *H04L 47/125* (2013.01); *H04L 47/32* (2013.01); *H04L 63/1408* (2013.01); *H04L 67/2814* (2013.01); *H04L 63/0218* (2013.01)

(58) Field of Classification Search
CPC ............ H04L 67/1012; H04L 67/1014; H04L 67/1019; H04L 67/1021; H04L 67/1023; H04L 67/1025; H04L 47/10; H04L 47/12; H04L 47/122; H04L 47/125
See application file for complete search history.

(56) References Cited

U.S. PATENT DOCUMENTS

| | | | |
|---|---|---|---|
| 7,656,872 B2 * | 2/2010 | Yoshimoto | H04L 12/2856 370/392 |
| 7,697,544 B1 * | 4/2010 | Ferguson | H04L 45/10 370/395.5 |
| 8,248,928 B1 * | 8/2012 | Wang | H04L 43/026 370/230 |
| 2004/0201709 A1 | 10/2004 | McIntyre et al. | |
| 2006/0120374 A1 | 6/2006 | Yoshimoto et al. | |
| 2006/0203820 A1 * | 9/2006 | Coluccio | H04L 12/66 370/392 |
| 2007/0175998 A1 | 8/2007 | Lev | |
| 2008/0031141 A1 | 2/2008 | Lean et al. | |
| 2008/0214175 A1 * | 9/2008 | Papadoglou | H04L 12/2856 455/422.1 |
| 2009/0077220 A1 | 3/2009 | Svendsen et al. | |
| 2009/0083362 A1 | 3/2009 | Svendsen | |
| 2009/0116451 A1 * | 5/2009 | Ng | H04L 12/5692 370/331 |
| 2010/0008248 A1 * | 1/2010 | Constantine | H04L 43/50 370/252 |
| 2010/0142371 A1 | 6/2010 | Gooch et al. | |
| 2011/0246495 A1 | 10/2011 | Mallinson | |
| 2011/0276396 A1 | 11/2011 | Rathod | |
| 2013/0013683 A1 | 1/2013 | Elliott | |
| 2017/0063783 A1 * | 3/2017 | Yong | H04L 67/2814 |

OTHER PUBLICATIONS

Gonzalez, J. et al., "Shunting: A Hardware/Software Architecture for Flexible, High-Performance Network Intrusion Prevention", CCS '07 Proceedings of the 14th ACM conference on Computer and Communications Security, Oct. 29, 2007, pp. 139-149, New York, USA, XP2602127A.

Lai, H. et al., "A Parallel Intrusion Detection System for High-Speed Networks", Applied Cryptography and Network Security, Lecture Notes in Computer Science, vol. 3089, 2004, pp. 439-451, Springer-Verlag, Berlin, Heidelberg, Germany, XP-002602138.

Kruegel, C. et al., "Stateful Intrusion Detection for High-Speed Networks", Proceedings of the IEEE Symposioum on Security and Privacy, 2002, Berkeley, CA, Conference Publication, May 12, 2002, pp. 285-293, IEEE Computer Society, USA, XP-002317215.

Schaelicke, L. et al., "SPANIDS: A Scalable Network Intrusion Detection Loadbalancer", Proceedings of the 2nd conference on Computing frontiers (2005), CF'05, Ischia, Italy, Jun. 4, 2005, pp. 315-322, Association for Computing Machinery, New York, USA, XP-002602147.

Quittek, J. et al, "Requirements for IP Flow Information Export (IPFIX)", Network Working Group, Request for Comments: 3917, Oct. 1, 2004, pp. 1-33, IETF, The Internet Society, 2004, [Retrieved on Jan. 16, 2013], Retrieved from Internet: https://tools.ietf.org/html/rfc3917.

Plummer, David C., "An Ethernet Address Resolution Protocol or Converting Network Protocol Addresses to 48.bit Ethernet Address for Transmission on Ethernet Hardware", Network Working Group, Request for Comments: 826, Nov. 1982.

Vallentin, M. et al., "The NIDS Cluster: Scalable, Stateful Netowrk Instrusion Detection on Commodity Hardware," Recent Advances in Intrusion Detection; [Lecture Notes in Compter Science], Springer Berlin Heidelberg, Berlin, Germany, Sep. 5, 2007, pp. 107-126, XP019098105.

* cited by examiner

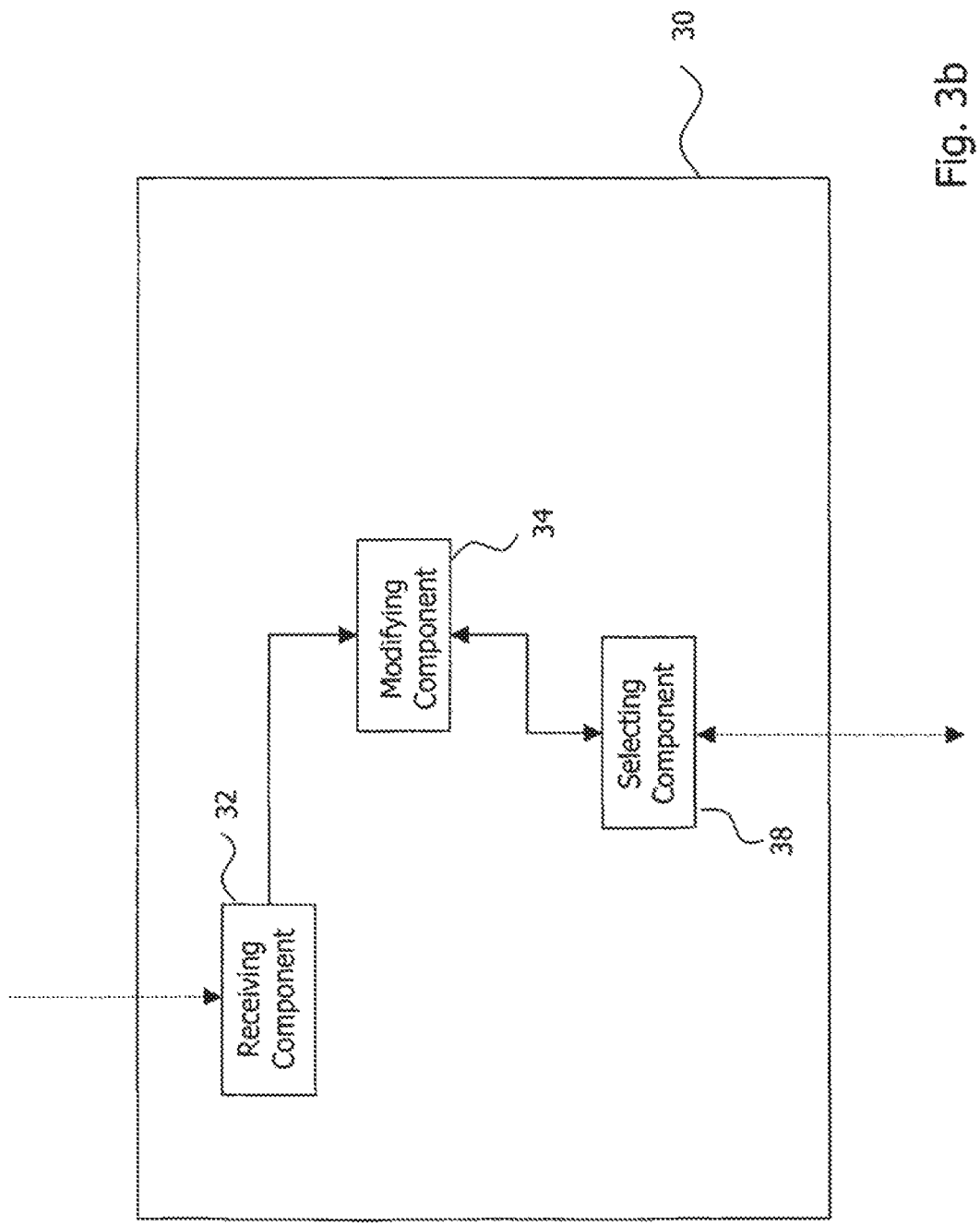

LOAD DISTRIBUTION ARCHITECTURE FOR PROCESSING TUNNELLED INTERNET PROTOCOL TRAFFIC

This application is a continuation of U.S. application Ser. No. 13/811,318, filed 8 Feb. 2013, which was the National Stage of International Application No. PCT/EP2010/004999, filed 13 Aug. 2010, the disclosures of all of which are incorporated by reference herein in their entirety.

TECHNICAL FIELD

The invention generally relates the field of processing and monitoring tunnelled Internet Protocol (IP) traffic. More specifically, the invention relates to a technique for redirecting Ethernet based tunnelled IP traffic in an IP communications network for load distribution.

BACKGROUND

As transmission speeds of communications networks continue to increase, the difficulty to effectively monitor and process the traffic transmitted over communications networks also increases. However, despite these high speeds, it is still desirable to monitor and/or process the traffic sent over high-speed IP communications networks.

Current IP traffic monitoring systems include full-duplex taps which copy IP traffic and send the copied packets to one or more processors for analysis while the original traffic maintains intact. However, some single processors may not be capable of processing high bandwidth IP traffic streams in real time or near real time, as is necessary for many applications. Thus, some systems split high bandwidth IP streams among a plurality of processors based on each packet's address information. This information can include a packet's source or destination IP address, Transmission Control Protocol (TCP) or User Datagram Protocol (UDP) port values, or its Stream Control Transmission Protocol (SCTP) information.

Current IP traffic monitoring systems rely upon each monitored packet being uniquely identifiable. In many cases, this is accomplished via each packet's IP and TCP, UDP, or SCTP address information.

Internet applications use the IP protocol suite for end-to-end communication today. In mobile access networks, the user IP traffic is encapsulated into the payload of a number of network and radio protocols while transmitted over the network and the air interface. Tunneling is a special form of encapsulation which ensures that user traffic is routed as per internal policies in the IP access network while the original packets are kept intact. In realizations, for example in $3^{rd}$ Generation Partnership Project (3GPP) based networks, the General Packet Radio Service (GPRS) Tunneling Protocol (GTP) is used to encapsulate the user IP packet in the tunnel IP packet.

In these networks, signalling message packets are tunnelled such that each packet includes the same outer IP address and/or TCP, UDP, or SCTP port information. In case processor selection is performed on the basis of the outer IP address (and/or TCP, UDP, or SCTP port information) the same processor would be selected for each packet, which would lead to an overload or at least to an extremely high load at the selected processor. Accordingly, where tunneling is used, the outer IP addresses and TCP, UDP, or SCTP header information are not usable to segregate traffic into multiple streams for splitting the traffic among a plurality of processors. Thus, a single network monitoring processor may be required to process all signalling message packets sent through the same tunnel. This may result in the processor being overwhelmed in current high speed networks.

Monitoring or controlling tunnelled IP traffic often requires the inspection of the payload of the tunnel IP packet, in particular the headers of the inner user IP packet. In this respect, Deep Packet Inspection (DPI) may be performed, which is the act of any packet network equipment (which is not an endpoint of a communication) using non-header content (typically the actual payload) for some purpose. This is usually performed as the packet passes an inspection point, searching for protocol non-compliance, viruses, spam, intrusions or predefined criteria to decide what actions to take on the packet, including collecting statistical information. This is in contrast to shallow packet inspection (usually called Stateful Packet Inspection) which just checks the header portion of a packet.

Commodity network elements such as network switches, routers or the like, are, however, limited for the inspection of Layer2/Layer3/Layer4 (Data Link Layer/Network Layer/Transport Layer) protocol parameters but not tunnel parameters.

For monitoring purpose, one approach is known from US 2008/0031141 A1 which proposes to distribute the packets among multiple processors within the monitoring device. For this purpose, the incoming packets arrive at a distributor function which selects the processor based on the header attributes of the inner user IP packet, typically based on the source and destination address. The limitation of this method is that it scales only as per the processors and memory can be put into one single node.

SUMMARY

Accordingly, there is a need to provide an improved and more efficient load distribution technique for tunnelled IP traffic.

According to a first aspect, a method of redirecting Ethernet based tunnelled Internet Protocol (IP) traffic in an IP communications network, wherein the Ethernet based tunnelled IP traffic is transmitted from a first network node to a second network node of the IP communications network, is provided. The method comprises the steps of receiving, by a device for redirecting the Ethernet based tunnelled IP traffic, an Ethernet based tunnelled IP packet transmitted from the first network node, the Ethernet based tunnelled IP packet including a header and a payload, the header containing a destination Ethernet address and the payload containing an inner user IP header of an inner user IP packet; modifying, by the device, the destination Ethernet address contained in the header of the Ethernet based tunnelled IP packet on the basis of the inner user IP header; and selecting, by the device, a Processing Unit (PU) for traffic analysis from a plurality of PUs for redirecting the Ethernet based tunnelled IP packet to the selected PU in accordance with the modified destination Ethernet address. The first and second network nodes may be any network node capable of communicating over an IP communications network. In this respect, the first and second network nodes may be a GPRS Support Node (GSN) which supports the use of GPRS in the GSM core network or other core networks. For example, the first network node may be a Serving GPRS Support Node (SGSN) which is responsible for the delivery of data packets from and to mobile stations within its service area. The second network node may be a Gateway GPRS Support Node (GGSN) which is responsible for the interworking between the GPRS network and external packet switched networks, like the Internet and X.25 networks.

Within the context of the method according to the first aspect the term the "Ethernet based tunnelled IP packet is transmitted from a first network node to a second network node" does not necessarily require that the transmitted Ethernet based tunnelled IP packets actually arrive at the second network node. This term has to be understood such that the Ethernet based tunnelled IP packets transmitted from the first network node are addressed to the second network node. In other words, the transmitted Ethernet based tunnelled IP packets are intended to be transmitted from the first network node to the second network node. When the Ethernet based tunnelled IP packets are redirected to the PU for analysis, the Ethernet based tunnelled IP packets may or may not be forwarded to the second network node (after the analysis performed by the PU). For example, the Ethernet based tunnelled IP packets may simply be discarded by the PU after having performed the analysis. However, even if the Ethernet based tunnelled IP packets finally do not arrive at the second network node (in case they are discarded or get lost on their way from the first to the second network node), the Ethernet based tunnelled IP packets are still originally transmitted from the first network node in the direction of the second network node, i.e. the second network node is the original destination address.

Further, within the context of the last step of the method according to the first aspect, a PU for traffic analysis is selected from the plurality of PUs for redirecting the Ethernet based tunnelled IP packet to the selected PU in accordance with the modified destination Ethernet address. In this step, the Ethernet based tunnelled IP packet is not yet actually redirected to the selected PU. Rather, in this step, the device selects the PU to which, in a later step, the Ethernet based tunnelled IP packet may be redirected. The step of redirecting, however, is not part of the step of selecting the PU, but may optionally be a subsequent step (following the step of selecting).

In this way, the method may further comprise the step of redirecting, by a redirecting component, the Ethernet based tunnelled IP packet to the selected PU in accordance with the modified destination Ethernet address. The redirecting component may be an Ethernet Switch (external from the device), which may receive, from the device, not only the Ethernet based tunnelled IP packet, but also instructions containing information to which PU the Ethernet based tunnelled IP packet is to be redirected.

In accordance with the method according to the first aspect, for the Ethernet based tunnelled IP packet, an appropriate PU is selected for traffic analysis. The term traffic analysis comprises any analysis of the Ethernet based tunnelled IP packet which can be performed in the respective PU. In this respect, the traffic analysis may comprise a monitoring function for monitoring the received Ethernet based tunnelled IP packets. The traffic analysis is, however, not limited to the mere monitoring function but may alternatively or additionally comprise a processing function for processing the received Ethernet based tunnelled IP packets.

The step of selecting the PU from the plurality of PUs may be static (static mode or static configuration) or dynamic (dynamic mode or dynamic configuration). In the static mode, the load of the plurality of PUs is not considered. According to the static mode, the device has no knowledge on the load of the plurality of PUs. In other words, the device does not receive any feedback from the plurality of PUs regarding their current load.

In the dynamic mode, the method may further comprise the step of receiving, by the device, one or more load indicators from the plurality of PUs, each load indicator indicating the load of one of the plurality of PUs. In this way, the device, e.g. periodically, receives feedback from one or more, e.g. all, of the plurality of PUs regarding their current load. The device may then select the PU from the plurality of PUs by considering the load of one or more, e.g. each, of the plurality of PUs, as indicated by the received one or more load indicators. By considering the load of one or more, e.g. each, of the plurality of PUs, the packets may be more equally distributed over the plurality of PUs. For example, the packets may be uniformally distributed over the plurality of PUs For instance, the device deduces from the received one or more load indicators that one of the plurality of PUs currently has the lowest load, e.g. the highest capacity for monitoring or processing a further packet. In this case, the step of selecting may comprise the step of selecting, by the device, the PU having the lowest load from the plurality of PUs based on the received one or more load indicators.

It may also be derived from the one or more load indicators that currently all of the plurality of PUs are overloaded (e.g. in case the load of the PUs is equal to or above a predetermined threshold load). In this case, the step of selecting may further comprise the step of selecting, by the device, no PU from the plurality of PUs if the received one or more load indicators indicate an overload in the plurality of PUs. In case of an overload in the plurality of PUs, the monitoring or processing of the current Ethernet based tunnelled IP packet may be skipped and, instead of the monitoring or processing, the current Ethernet based tunnelled IP packet may be forwarded to the second network node, rather than to one of the plurality of PUs.

Alternatively or additionally, the robustness of the method may be increased by means of a Virtual Local Area Network (VLAN) tag indicating a logical separation of the plurality of PUs into two or more subsets of the plurality of PUs. For example, the header of the Ethernet based tunnelled IP packet may further include a VLAN tag and the PU may be selected by not only considering the Ethernet destination address but by further considering the VLAN tag. For example, each PU can be but into one VLAN so that the plurality of PUs may be arranged in a plurality of VLANs independent from each other. The VLAN tag may be signalled from one PU to the device so that the device can locate the PU by also considering the VLAN tag.

The additional use of VLAN tags in a VLAN configuration (e.g. putting each PU into one isolated VLAN) may increase the robustness of the method. For example, each PU periodically can report the load status to the device. Whenever a PU gets out-of-order (e.g. hardware failure, power outage etc.), the status reporting will be missing. In consequence, the device may conclude from the missing load status of the PU that the device should stop addressing this PU for sending packets to this PU. The actual sending may be performed by the redirecting component, which preferably has no knowledge on the status of the PU except of the destination Ethernet address and port of the PU (which may be used for selecting the output interface). Without VLAN handling, in temporal situations (e.g. when the redirecting component reboots and the learnt destination Ethernet address/port assignments are lost in the redirecting component), the redirecting component may broadcast each packet on every port to locate the PU. This may lead to an overload on every link of each PU for a while. By means of the additional VLAN configuration, in which exemplarily each PU is put into one VLAN, which is e.g. statically configured into the redirecting component, the broadcast to every PU may be prevented and the overload may be prevented or at least decreased. For example, the VLANs may be independent from each other and the traffic (the traffic from the redirecting component to the PUs) may be isolated among them. To correctly address the appropriate PU, the device preferably has to modify not only the destination Ethernet address, but also the VLAN tag associated with the corresponding PU.

According to one implementation of the method according to the first aspect, the same PU may be selected for all Ethernet based tunnelled IP packets of a data session. In this way, it can be ensured that the same PU receives all packets of one data session. In one variant of this implementation, it is, however, conceivable that, although it is intended to redirect all packets of one data session to the same PU, a control operation may be carried out, in case overload of the PU is determined. In this case, the packets of one data session originally intended to be redirected to a first PU, may, in case of overload of the first PU, be redirected to a one or more further PUs until it is determined that the first PU has sufficient capacities available (the load of the first PU has dropped below a predetermined threshold load).

Independent of how the selection of the PU is implemented (static mode, dynamic mode, with or without VLAN tag), the plurality of PUs may be adapted to monitor the Ethernet based tunnelled IP packets (monitoring mode) or may be adapted to process the Ethernet based tunnelled IP packets (controlling mode).

In the monitoring mode, the method may further comprise the step of monitoring the Ethernet based tunnelled IP packet in the PU. The step of monitoring may comprise the step of performing Deep Packet Inspection (DPI) on the Ethernet based tunnelled IP packet in the PU. However, the monitoring mode is not limited thereto but may comprise any form of inspection for obtaining useful information about the Ethernet based tunnelled IP packet, like information about protocol non-compliance, viruses, spam, intrusions or predefined criteria to decide what actions to take on the packet. Also, the PU may, in the monitoring mode, collect statistical information about the received Ethernet based tunnelled IP packets, e.g. information about the destination of the packets, the traffic load and so on.

When in monitoring mode, the method may further comprise the step of copying the Ethernet based tunnelled IP packet transmitted from the first network node and receiving, by the device, the copied Ethernet based tunnelled IP packet. In this way, the whole traffic between the first network node and the second network node may remain intact and only the copied traffic may be redirected to the PUs for the monitoring purpose.

Independent of which inspection is performed in the step of monitoring, the method may further comprise the step of discarding the Ethernet based tunnelled IP packet in the PU after the packet has been monitored by the PU. This option of discarding the packets after the monitoring step is in particular conceivable when the original traffic is kept intact and only a copy of the original traffic (a copy of the original Ethernet based tunnelled IP packets) is received by the PUs for monitoring. In this way, the traffic between the first network node and the second network node remains unaffected as if no monitoring would have been carried out.

In the processing mode, the method may further comprise the steps of processing the Ethernet based tunnelled IP packet in the PU; receiving, by the device, the processed Ethernet based tunnelled IP packet; restoring, by the device, the original destination Ethernet address contained in the Ethernet based tunnelled IP packet; and directing, by the device, the processed Ethernet based tunnelled IP packet to the second network node in accordance with the restored original destination Ethernet address. In contrast to the monitoring mode, the original traffic between the first network node and the second network node is preferably not resumed in the processing mode. In other words, in the processing mode, the original traffic between the first and second network nodes may actually be redirected such that the original traffic itself rather than a copy of the original traffic (like in the monitoring mode), is redirected to the PUs.

In other words, in the processing mode, at first, the PU for performing the processing task is selected in accordance with the method according to the first aspect. Then, the original traffic itself may be redirected to the selected PU, in which the redirected traffic may be processed. After the Ethernet based tunnelled IP packet has been redirected to the PU and as been actually processed in the PU, the processed Ethernet based tunnelled IP packet may be forwarded from the PU to the device. In the device, the original destination address of the processed Ethernet based tunnelled IP packet may be restored. After restoring the original destination address (the address indicating that the packet is to be forwarded to the second network node), the processed Ethernet based tunnelled IP packet may be forwarded, by the device, to the second network node. In this way, although the original direct communication between the first and the second network node does not remain intact but is redirected, the traffic finally arrives at the intended original destination (the second network node).

The processing performed in the PU may comprise one or more of modifying, filtering and delaying the Ethernet based tunnelled IP packet.

The step of restoring the original destination Ethernet address may be performed as follows: After the device has received the Ethernet based tunnelled IP packet from the first network node, it may store the original destination Ethernet address in a storage component. Then, it modifies the destination Ethernet address contained in the header of the Ethernet based tunnelled IP packet on the basis of the inner user IP header. After modifying the destination Ethernet address, the device selects the PU for processing of the Ethernet based tunnelled IP packet based on the modified destination Ethernet address and forwards the Ethernet based tunnelled IP packet to the redirecting component which redirects the Ethernet based tunnelled IP packet to the selected PU. After the processing, the Ethernet based tunnelled IP packet is forwarded from the PU to the redirecting component and from the redirecting component to the device. In the device, the original destination Ethernet address is retrieved from the storage component and the destination Ethernet address contained in the header of the Ethernet based tunnelled IP packet is modified on the basis of the retrieved original destination Ethernet address. In this way, the original destination Ethernet address can be rewritten into the header of the Ethernet based tunnelled IP packet and the Ethernet based tunnelled IP packet can be finally directed to its original destination (the second network node).

In accordance with one realization, the method according to the first aspect may further comprise the step of automatically learning a plurality of destination Ethernet addresses, wherein each destination Ethernet address corresponds to one of the plurality of PUs. For example, the destination Ethernet address may a Media Access Control ("MAC") address. By means of the learned MAC addresses, the destination Ethernet address of the header of the Ethernet based tunnelled IP packet can be rewritten, e.g. by considering both the learned MAC address of one PU and the inner user IP address retrieved from the inner user IP header of the inner user IP packet.

According to a second aspect, a computer program product is proposed, comprising program code portions for performing steps of any one of the method aspects described herein, when the computer program product is run on one or more computing devices. The computer program product may be stored on a computer readable recording medium.

According to a third aspect, a device for redirecting Ethernet based tunnelled Internet Protocol (IP) traffic in an IP communications network, wherein the Ethernet based tunnelled IP traffic is transmitted from a first network node to a second network node of the IP communications network, is proposed. The device comprises: a receiving component for receiving an Ethernet based tunnelled IP packet transmitted from the first network node, the Ethernet based tunnelled IP packet including a header and a payload, the header containing a destination Ethernet address and the payload containing an inner user IP header of an inner user IP packet; a modifying component for modifying the destination Ethernet address contained in the header of the Ethernet based tunnelled IP packet on the basis of the inner user IP header; and a selecting component for selecting a Processing Unit (PU) for traffic analysis from a plurality of PUs for redirecting the Ethernet based tunnelled IP packet to the selected PU in accordance with the modified destination Ethernet address.

According to a first variant of the third aspect, the device may further comprise a reading component for reading the inner user IP header of the inner user IP packet. In accordance with the first variant, the modifying component may be adapted to modify the destination Ethernet address contained in the header of the Ethernet based tunnelled IP packet based on the read inner user IP header.

According to a second variant of the third aspect, which may be combined/not combined with the first variant, the device may further comprise: a restoring component for restoring the original destination Ethernet address contained in the Ethernet based tunnelled IP packet; and a directing component for directing the Ethernet based tunnelled IP packet to the second network node in accordance with the restored original destination Ethernet address.

The device may further comprise a learning component for automatically learning a plurality of destination Ethernet addresses, each destination Ethernet address corresponding to one of the plurality of PUs.

According to a fourth aspect, a Processing Unit (PU) for analyzing a redirected Ethernet based tunnelled Internet Protocol (IP) packet is proposed. In accordance with the fourth aspect, the PU is adapted to perform at least one of monitoring the redirected Ethernet based tunnelled IP packet and processing the redirected Ethernet based tunnelled IP.

The PU may be adapted to process the redirected Ethernet based tunnelled IP by performing at least one of modifying, filtering and delaying the redirected Ethernet based tunnelled IP packet.

According to a fifth aspect, a system for redirecting Ethernet based tunnelled Internet Protocol ("IP") traffic in an IP communications network, wherein the Ethernet based tunnelled IP traffic is transmitted from a first network node to a second network node of the IP communications network is proposed. The system comprises: the device according to the third aspect; a redirecting component for redirecting the Ethernet based tunnelled IP packet to the selected PU in accordance with the modified destination Ethernet address.

The system may further comprise a plurality of PUs according to the fourth aspect.

Still further, the system may additionally comprise a copying component for copying the Ethernet based tunnelled IP packet transmitted from the first network node, wherein the receiving component is adapted to receive the copied Ethernet based tunnelled IP packet.

The copying component may be an Ethernet tap or an Ethernet switch port mirroring device. The redirecting component may be an Ethernet Switch.

BRIEF DESCRIPTION OF THE DRAWINGS

In the following, the invention will further be described with reference to exemplary embodiments illustrated in the figures, in which:

FIG. 1b is a schematic illustration of the first device embodiment of FIG. 1a;

FIG. 2b is a flow diagram schematically illustrating a second method embodiment (controlling mode) for redirecting Ethernet based tunnelled IP traffic from the first node to one of the plurality of Processing Units and for directing the processed Ethernet based tunnelled IP traffic from the Processing Unit to the second node of FIG. 1a;

FIG. 3b is a schematic illustration of the second device embodiment of FIG. 3a;

FIG. 4b is a flow diagram schematically illustrating a fourth method embodiment (monitoring mode) for redirecting Ethernet based tunnelled IP traffic from the first node to one of the plurality of Processing Units of FIG. 3a;

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with Ethernet taps and Ethernet switches to illustrate the present invention, they are equally applicable to other kinds of tapping and switching techniques. Also, the invention may be practiced in any network to which mobile and/or stationary users may attach. For example, the present invention is applicable to, besides cellular networks, computer networks, Wireless Local Area Networks (WLANs), or similar wireless networks, but also to wireline networks such as, for example, the intranet of a company with some or many separated subsidiaries or the Internet. Further, the term node used hereinbelow may be any kind of network node capable of communicating over an IP communications network. In this respect, the first and second nodes may be a GPRS Support Node (GSN) which supports the use of GPRS in the GSM core network or other core networks. For example, the first node may be a Serving GPRS Support Node (SGSN) which is responsible for the delivery of data packets from and to mobile stations within its service area. The second node may be a Gateway GPRS Support Node (GGSN) which is responsible for the interworking between the GPRS network and external packet switched networks, like the Internet and X.25 networks.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1A:
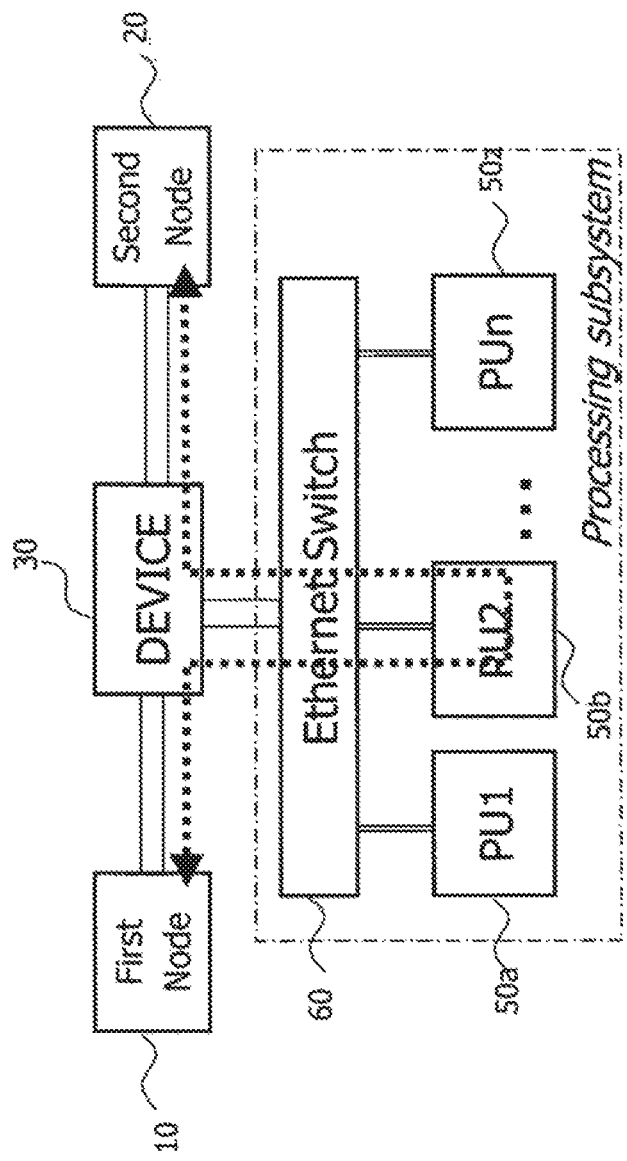
FIG. 1a is a schematic illustration of a first system embodiment comprising a device according to a first device embodiment, an Ethernet switch and a plurality of Processing Units arranged between a first and a second node.

In FIG. 1a, a first system embodiment for redirecting Ethernet based tunnelled IP traffic in an IP communications network is schematically illustrated. The system embodiment comprises a first node 10 and a second node 20 which communicate with each over IP communications network. In all exemplary embodiments described below with respect to the figures, the first 10 and second nodes 20 may be implemented as a SGSN and a GGSN. However, the invention is not limited thereto. The system embodiment further comprises a device 30 for redirecting the Ethernet based tunnelled IP traffic in the IP communications network. Additionally, the system embodiment comprises an Ethernet switch 60 and a plurality of Processing Units PUs The Ethernet switch 60 and the plurality of PUs 50a, 50b, . . . , 50z form a processing subsystem of the system embodiment. The Ethernet switch 60 may distribute the traffic to any number of PUs 50a, 50b, . . . , 50z. For example, the Ethernet switch 60 can distribute traffic among fifty to one hundred PUs 50a, 50b, . . . , 50z (ports). It is also conceivable that two or more Ethernet switches 60 can be stacked such that e.g. one hundred to five hundred ports (PUs 50a, 50b, . . . , 50z) can be effectively served. Alternatively, also only ten to thirty, e.g. twenty, PUs 50a, 50b, . . . , 50z may be served by the Ethernet switch 60. As a further alternative, it is also conceivable that the traffic may only be distributed by the Ethernet switch 60 among only a small number of PUs 50a, 50b, . . . , 50z, e.g. less than five PUs like four, three, two or even one PU.

Figure 1B:
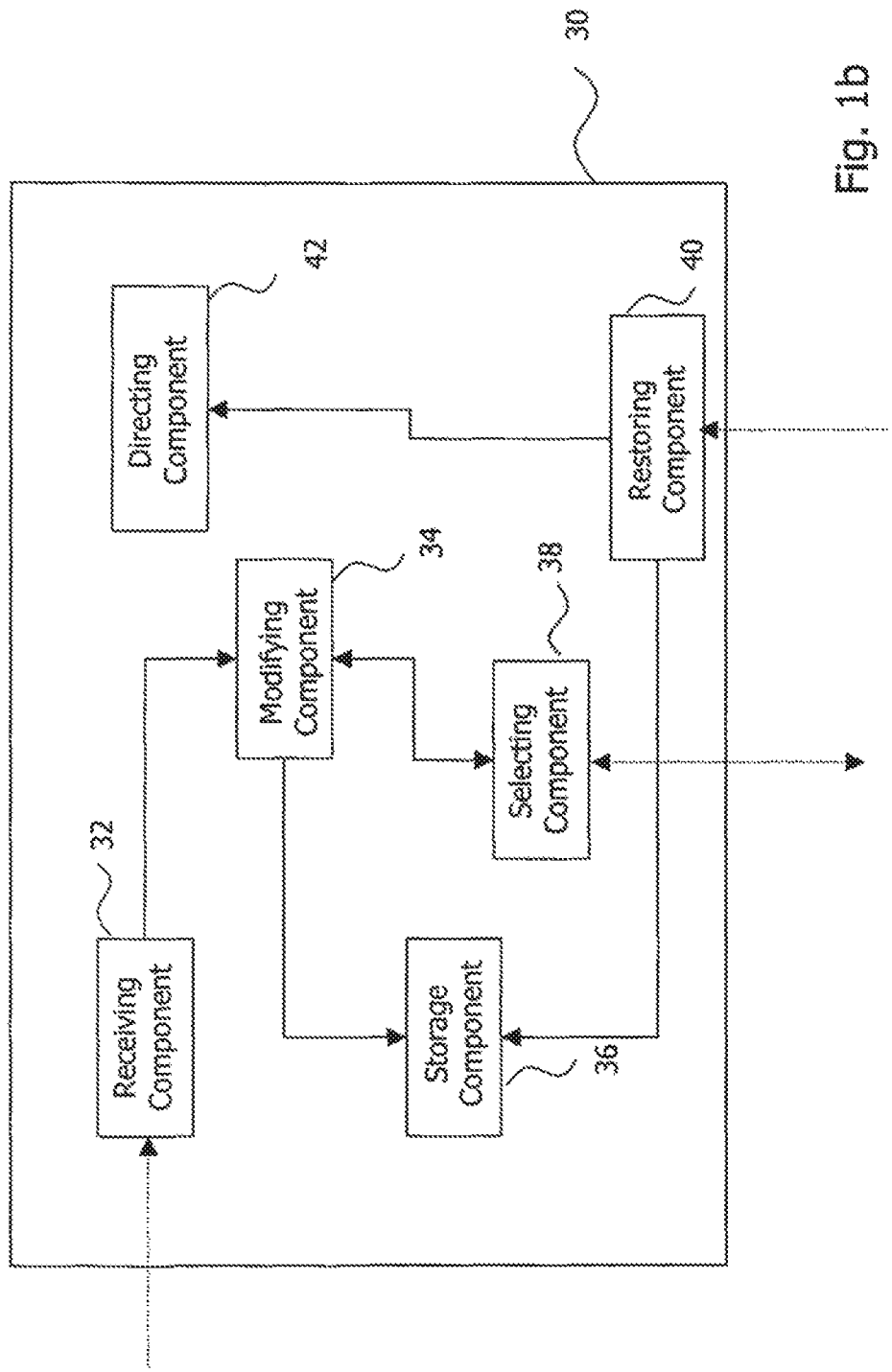

Details of the device 30 are set out with respect to the first device embodiment as shown in FIG. 1b. According to the first device embodiment, the device 30 comprises a receiving component 32, a modifying component 34, a storage component 36, a selecting component 38, a restoring component 40 and a directing component 42.

The functionality of the components of the system embodiment of FIG. 1a and of the device embodiment of FIG. 1b will be described in more detail below with respect to the flow diagrams illustrated in FIGS. 2a and 2b.

Figure 2A:
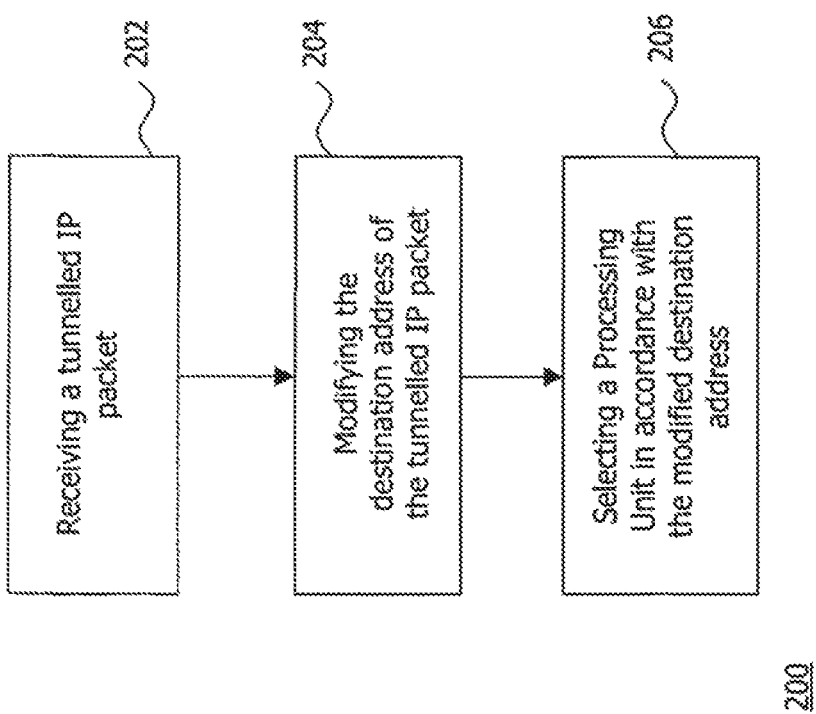
FIG. 2a is a flow diagram schematically illustrating a first method embodiment for redirecting Ethernet based tunnelled IP traffic from the first node to one of the plurality of Processing Units of FIG. 1a for controlling the redirected Ethernet based tunnelled IP traffic.

FIG. 2a illustrates a first method embodiment. According to the first method embodiment, in step 202, the receiving component 32 of the device 30 receives an Ethernet based tunnelled IP packet transmitted from the first network node 10. The Ethernet based tunnelled IP packet includes a header and a payload, wherein the header contains an Ethernet destination Media Access Control (MAC) address. The Ethernet destination MAC address indicates that the Ethernet based tunnelled IP packet is addressed to the second node 20, i.e. the header of the Ethernet based tunnelled IP packet contains the address of the second node as the packet's address. The payload of the Ethernet based tunnelled IP packet contains an inner IP packet, i.e. the inner IP packet is encapsulated in the Ethernet based tunnelled IP packet. The inner IP packet includes an inner IP header and inner IP payload data.

In step 204, the modifying component 34 of the device 30 modifies the Ethernet destination MAC address contained in the header of the Ethernet based tunnelled IP packet on the basis of the inner IP header. The modification may be performed as follows: The modifying component 34 inspects the inner IP header of the inner IP packet and retrieves the destination address contained in the inner IP header. In addition, MAC learning is used by the modifying component to learn the MAC addresses of the plurality of PUs 50a, 50b, . . . , 50z. After retrieving the destination address from the inner IP header and/or performing the MAC learning, the modifying component 34 rewrites the Ethernet destination MAC address of the Ethernet based tunnelled IP packet. For rewriting the Ethernet destination MAC address the modifying component 34 uses both the destination address retrieved from the inner IP header of the inner IP packet and one of the MAC addresses (of the PUs) learned during MAC learning.

Optionally, before rewriting the Ethernet destination MAC address of the Ethernet based tunnelled IP packet, the modifying component may retrieve the original Ethernet destination MAC address from the header of the Ethernet based tunnelled IP packet and may store the original Ethernet destination MAC address in the storage component 36. The modifying component 34 may retrieve the Ethernet destination MAC address before or after retrieving the destination address from the inner IP header. Alternatively, the modifying component 34 may be adapted to concurrently retrieve the Ethernet destination MAC address from the header of the Ethernet based tunnelled IP packet and the destination address from the inner IP header of the inner IP packet.

As a further option (hereinbelow referred to as VLAN configuration), which may/may not be combined with the previous option, a Virtual Local Area Network (VLAN) configuration may be used. In this VLAN configuration, each PU can be but into one VLAN so that the plurality of PUs 50a, 50b, . . . , 50z is arranged in a plurality of VLANs independent from each other. A VLAN tag is signalled, from one PU to the device 30, so that the device 30 can locate the PU by also considering the VLAN tag.

Thus, using the VLAN configuration, the header of the Ethernet based tunnelled IP packet further includes a VLAN tag and the PU is selected by not only considering the Ethernet destination address but by further considering the VLAN tag. By means of the additional VLAN configuration, in which each PU is put into one VLAN (statically configured in the Ethernet switch 60), the traffic between the Ethernet switch 60 and each PU can be isolated from each other because the VLANs (and thus the PUs) are independent from each other. To correctly address the appropriate PU, the device 30, in accordance with this option, has to modify not only the Ethernet destination MAC address, but also the VLAN tag associated with the corresponding PU.

In step 206, the selecting component 38 of the device 30 selects one of the PUs 50*a*, 50*b*, . . . , 50*z* in accordance with the modified Ethernet destination MAC address. In the following, it is exemplarily assumed that the second PU 50*b* is selected by the selecting component 38. When using the optional VLAN configuration, the selecting component 38 of the device 30 selects one of the PUs 50*a*, 50*b*, . . . , 50*z* in accordance with the modified Ethernet destination MAC address and the VLAN tag of the Ethernet based tunnelled IP packet.

In accordance with a first implementation of step 206 (static mode), the selecting component of the device 30 selects the PU 50*b* from the plurality of PUs 50*a*, 50*b*, . . . , 50*z*, because the PU 50*b* is indicated by the modified Ethernet destination MAC address.

In accordance with a second implementation of step 206 (dynamic mode), the selecting component 38 of the device 30 selects the PU 50*b* from the plurality of PUs 50*a*, 50*b*, . . . 50*z* by not only considering the modified Ethernet destination MAC address, but by further considering the load of the plurality of PUs 50*a*, 50*b*, . . . 50*z*. In the dynamic mode, the selecting component 38 has knowledge about the respective load of each of the plurality of PUs 50*a*, 50*b*, . . . 50*z*. This knowledge is obtained by the selecting component 38 such that each of the plurality of PUs 50*a*, 50*b*, . . . 50*z* transmits a load indicator indicating its current load, i.e. the free capacity each PU currently has for packet processing. In the dynamic mode, the selecting component 38 may deviate from the destination indicated by the modified Ethernet destination MAC address, because the PU (to which the packet is to be redirected in accordance with the modified Ethernet destination MAC address) does not have any or not sufficient capacities. Alternatively, although the PU indicated by the modified Ethernet destination MAC address has sufficient capacities (i.e., the load is low enough for packet processing), the selecting component may select a different PU because the different PU has an even lower load or no load at all. In the dynamic mode, the lowest reported load indicator may be used to select the PU for each new data session.

Figure 2B:
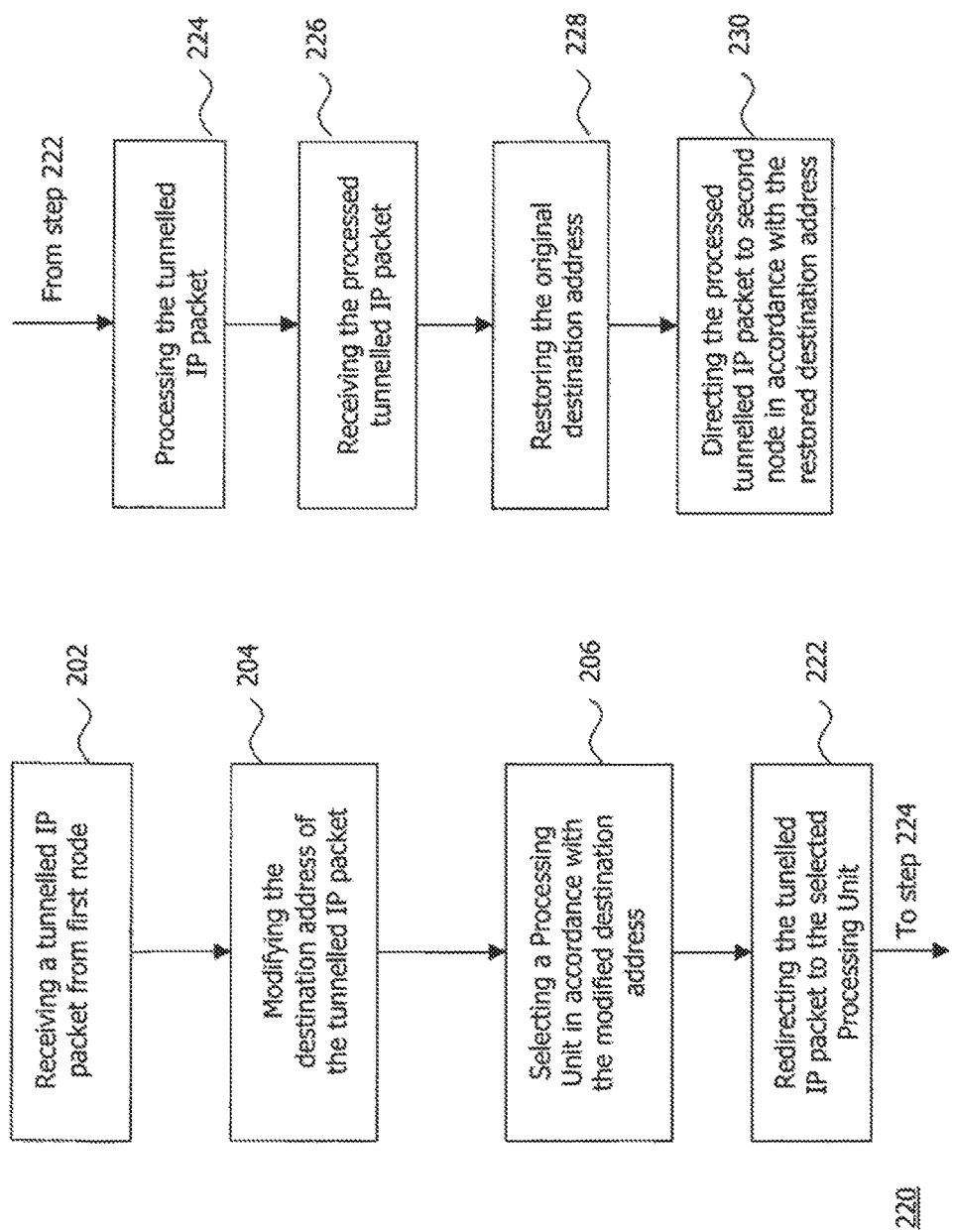

FIG. 2*b* illustrates a second method embodiment. The steps 202, 204, 206 of FIG. 2*b* are equivalent to those of FIG. 2*a*.

The second method embodiment (controlling mode) comprises the steps of the first method embodiment of FIG. 2*a* and further method steps 222 to 230. After the selecting component 38 of the device 30 has selected the appropriate PU 50*b* either by using the static or dynamic mode, the Ethernet based tunnelled IP packet is redirected (in step 222), by the Ethernet switch 60, to the selected PU 50*b*. The selected PU 50*b* then, after receiving the redirected Ethernet based tunnelled IP packet, processes the Ethernet based tunnelled IP packet in step 224. A couple of different processing operations may be performed by the PU 50*b*. These processing operations include e.g. modifying, filtering or delaying the redirected Ethernet based tunnelled IP packet. Also a combination of different processing operations is possible, e.g. the PU 50*b* may, at first, filter the redirected Ethernet based tunnelled IP packet and may thereafter delay the filtered Ethernet based tunnelled IP packet.

After processing the Ethernet based tunnelled IP packet in step 224, the PU 50*b* forwards the processed Ethernet based tunnelled IP packet to the Ethernet switch 60 which then itself forwards the processed Ethernet based tunnelled IP packet to the device 30, so that the device 30 receives the processed Ethernet based tunnelled IP packet in step 226.

The restoring component 40 of the device 30 restores the original Ethernet destination MAC address in step 228. The restoring may be performed by retrieving the original Ethernet destination MAC address from the storage component 36 and by rewriting the original Ethernet destination MAC address in the header of the Ethernet based tunnelled IP packet based on the retrieved original Ethernet destination MAC address. In case the optional VLAN configuration is used, the restoring component 40 of the device 30 does not only restore the original Ethernet destination MAC address, but also the VLAN tag of the Ethernet based tunnelled IP packet in step 228.

The processed Ethernet based tunnelled IP packet is then finally directed (in step 230) by the directing component 42 of the device 30 to the second node 20 in accordance with the restored original Ethernet destination MAC address contained in the header of the Ethernet based tunnelled IP packet. In the optional VLAN configuration, the processed Ethernet based tunnelled IP packet is directed (in step 230) to the second node 20 by not only considering the restored original Ethernet destination MAC address contained in the header of the Ethernet based tunnelled IP packet, but also the VLAN tag contained in the header of the Ethernet based tunnelled IP packet.

In accordance with the first system embodiment shown in FIG. 1*a*, the first device embodiment shown in FIG. 1*b*, and the first and second method embodiments shown in FIGS. 2*a* and 2*b*, the original data flow between the first node 10 and the second node 20 is interrupted by the device 30 and routed through the processing subsystem.

In this way, the invention splits the distribution and switching functions to achieve a scaleable processing architecture for Ethernet based tunnelled traffic, suitable for controlling purpose. The routing decision (selection of the PU), unlike in existing Ethernet switches or routers, is made based on the inner IP header and the Ethernet destination MAC address is modified (rewritten) before sending the traffic to the processing subsystem. The distribution of the traffic and thus the selection of the PU 50*b* is determined by the destination MAC address of the PU 50*b*. The actual switching is performed by the complementing Ethernet switch 60.

In accordance with one implementation detail of the system embodiment, the device 30 ensures that the packets of each data session select consistently the same PU, e.g. the selecting component 38 consistently selects the same second PU 50*b* for the packets of a first data session and the selecting component 38 consistently selects the same third PU 50*c* for the packets of a second data session.

Figure 3A:
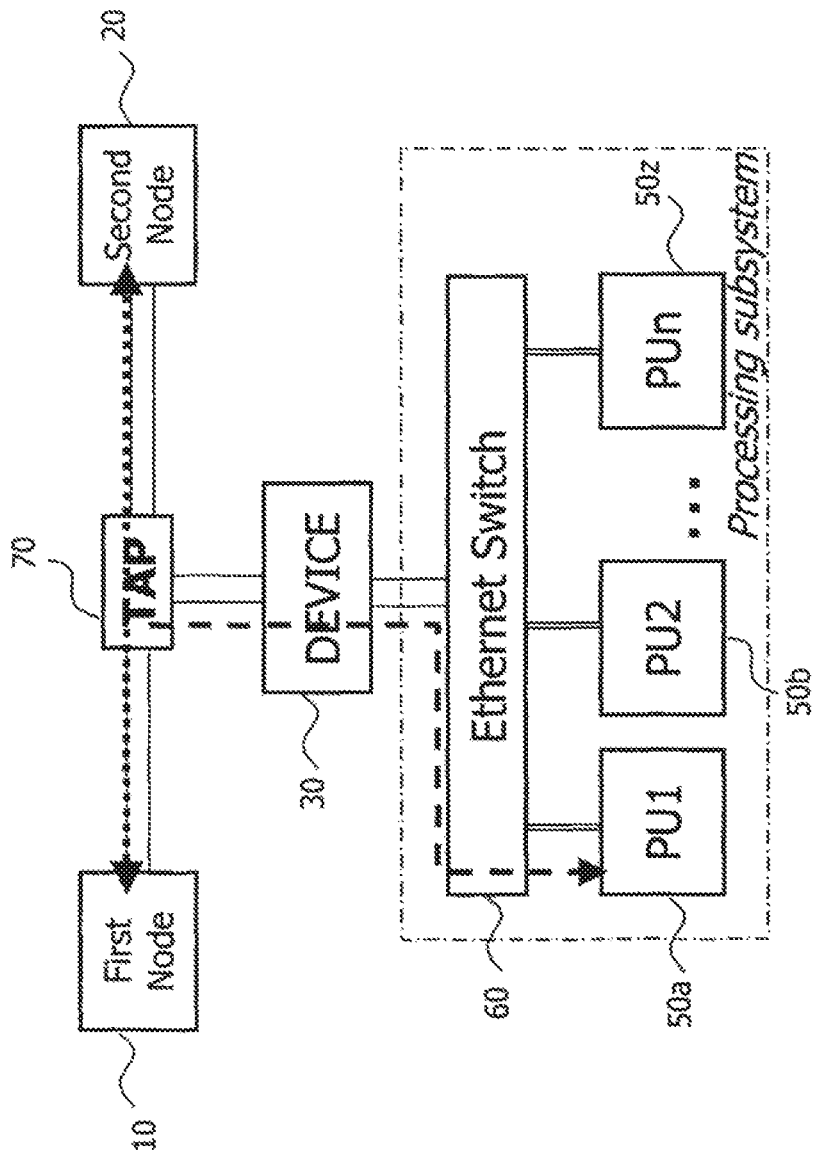
FIG. 3a is a schematic illustration of a second system embodiment comprising a device according to a second device embodiment, an Ethernet switch, a plurality of Processing Units and an Ethernet tap arranged between a first and a second node.

In FIG. 3*a*, a second system embodiment for redirecting Ethernet based tunnelled IP traffic in an IP communications network is schematically illustrated. In FIG. 3*a*, components corresponding to those of FIG. 1*a* are provided with the same reference signs.

In addition to the first system embodiment shown in FIG. 1*a*, the second system embodiment of FIG. 3*a* further comprises an Ethernet tap 70. Instead of the Ethernet tap 70 any other device having similar functionality may be used, e.g. an Ethernet switch port mirroring device.

FIG. 3b shows a device 30 according to a second device embodiment, which is configured differently than the first device embodiment illustrated in FIG. 1b. The device 30 according to the second device embodiment comprises a receiving component 32, a modifying component 34 and a selecting component 38. As exemplarily illustrated in FIG. 3b, the device 30 according to the second device embodiment does not necessarily have to comprise the storage component 36, the restoring component 40 and the directing component 42, but may comprise one or more of said components.

The functionality of the second system embodiment of FIG. 3a and the second device embodiment of FIG. 3b, is explained with reference to FIGS. 4a and 4b below.

Figure 4A:
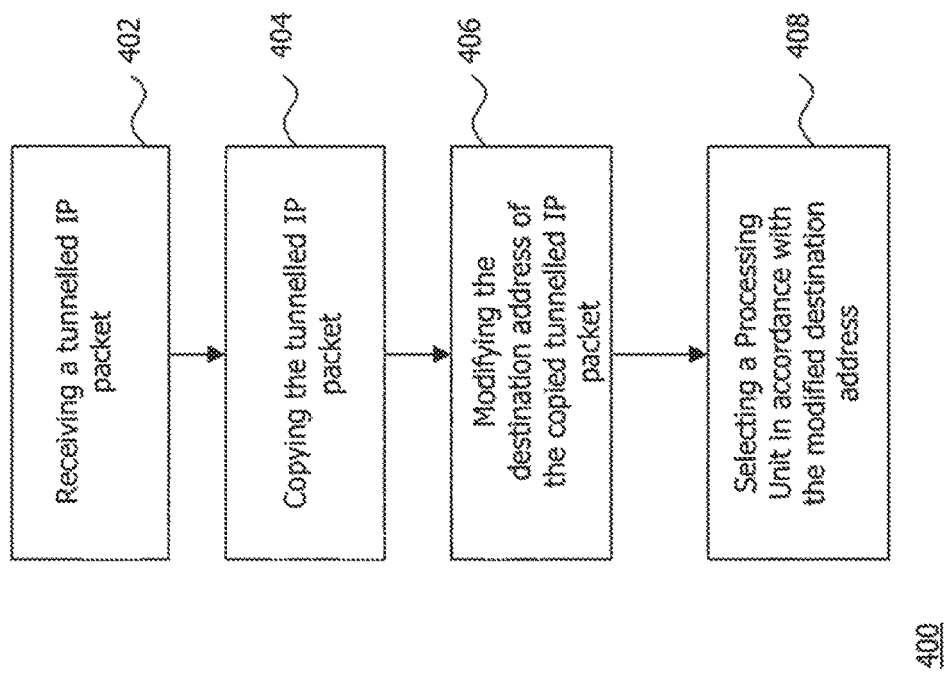
FIG. 4a is a flow diagram schematically illustrating a third method embodiment for redirecting Ethernet based tunnelled IP traffic from the first node to one of the plurality of Processing Units of FIG. 3a for monitoring the redirected Ethernet based tunnelled IP traffic.

FIG. 4a illustrates a third method embodiment. According to the third method embodiment, in step 402, the Ethernet tap 70 receives an Ethernet based tunnelled IP packet transmitted from the first network node 10. The Ethernet based tunnelled IP packet includes a header and a payload, wherein the header contains an Ethernet destination MAC address (in the optional VLAN configuration, the header further contains a VLAN tag). The Ethernet destination MAC address indicates that the Ethernet tunnelled IP packet is addressed to the second node 20, i.e. the header of the Ethernet based tunnelled IP packet contains the address of the second node as the packet's address. The payload of the Ethernet based tunnelled IP packet contains an inner IP packet, i.e. the inner IP packet is encapsulated in the Ethernet based tunnelled IP packet. The inner IP packet includes an inner IP header and inner IP payload data.

In step 404, the Ethernet tap 70 copies the received Ethernet based tunnelled IP packet and forwards the copied Ethernet based tunnelled IP packet to the device 30. In addition, the Ethernet tap 70 forwards the unamended original Ethernet based tunnelled IP packet to the second node 20. In this way, the original traffic between the first node 10 and the second node 20 is left intact by the Ethernet tap 70, i.e. the original Ethernet based tunnelled IP packets received by the Ethernet tap 70 are forwarded to the second node 20 and the copied Ethernet based tunnelled IP packets are forwarded by the Ethernet tap 70 to the device 30.

The receiving component 32 of the device 30 receives the copied Ethernet based tunnelled IP packet and forwards the packet to the modifying component 34 of the device 30. The modifying component 34 modifies the Ethernet destination MAC address contained in the header of the Ethernet based tunnelled IP packet on the basis of the inner IP header in step 406. The modification may be performed as follows: The modifying component 34 inspects the inner IP header of the inner IP packet and retrieves the destination address contained in the inner IP header. In addition, the modifying component 34 performs MAC learning and thus learns the MAC addresses of the plurality of PUs. After retrieving the destination address from the inner IP header, the modifying component 34 rewrites the Ethernet destination MAC address of the Ethernet based tunnelled IP packet based on the destination address retrieved from the inner IP header of the inner IP packet and the MAC address of one of the PUs. The Ethernet based tunnelled IP packet having the modified Ethernet destination address is then forwarded to the selecting component 38 of the device 30. As described with respect to step 204 above, optionally also the VLAN configuration can be used additionally and the VLAN tag has to be modified for addressing the appropriate PU in addition to the Ethernet destination MAC address.

In step 408, the selecting component 38 of the device 30 selects one (in the following exemplarily PU 50b is selected) of the PUs 50a, 50b, . . . , 50z in accordance with the modified Ethernet destination MAC address. The selecting component 38 can either operate in static mode or in dynamic mode as set forth with respect to FIGS. 1a, 1b, 2a and 2b above. Independent of whether the static or dynamic mode is used by the selecting component 38, one (the PU 50b) of the plurality of PUs 50a, 50b, . . . , 50z is selected by the selecting component 38. When the optional VLAN configuration is implemented, the selecting component 38 of the device 30 selects one of the PUs 50a, 50b, . . . , 50z in accordance with the modified Ethernet destination MAC address and the modified VLAN tag.

Figure 4B:
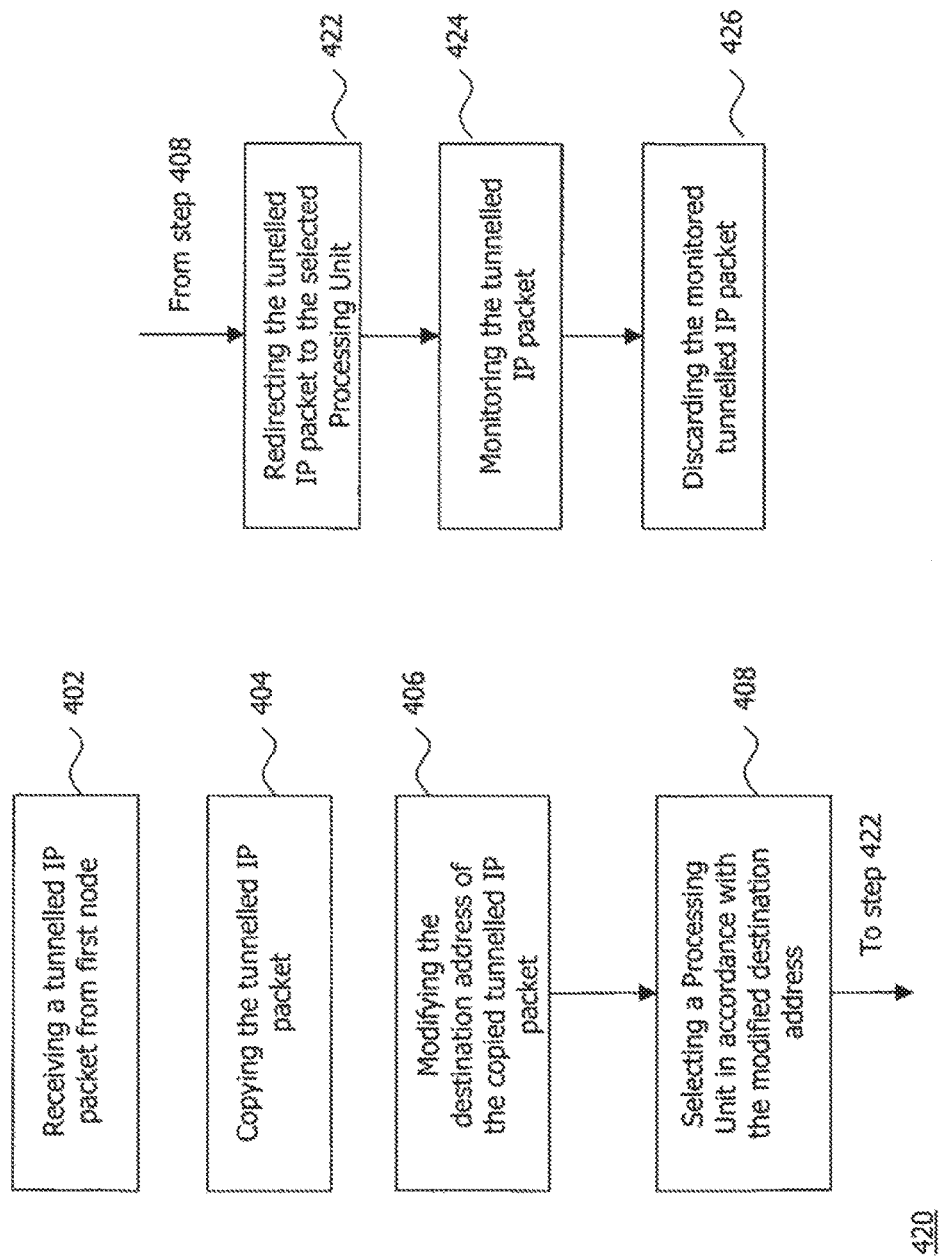

FIG. 4b illustrates a fourth method embodiment. The steps 402, 404, 406 and 408 of FIG. 4b are equivalent to those of FIG. 4a.

The fourth method embodiment (monitoring mode) comprises steps 402 to 408 and the further steps 422 to 426. After the selecting component 38 of the device 30 has selected the appropriate PU 50b either by using the static or dynamic mode in step 406, the Ethernet based tunnelled IP packet is redirected (in step 422), by the Ethernet switch 60, to the selected PU 50b. The selected PU 50b then, after receiving the Ethernet based tunnelled IP packet, monitors the Ethernet based tunnelled IP packet in step 424. A couple of different monitoring operations may be performed by the PU 50b. For example, the PU 50b collects statistical information related to the Ethernet based tunnelled IP packet.

After monitoring the Ethernet based tunnelled IP packet in step 424, the PU 50b discards the monitored the Ethernet based tunnelled IP packet in step 426. Alternatively to discarding the Ethernet based tunnelled IP packet in step 426, the Ethernet based tunnelled IP packet may also be kept by the PU 50b e.g. for later monitoring operations.

In accordance with the third and fourth method embodiments, the original data flow between the first node 10 and the second node 20 is left intact by employing the Ethernet tap 70 to break-out the physical signal for monitoring purpose. The device 30 routes the duplicated (copied) frame to the appropriate PU 50b which eventually absorbs (discards) the traffic (no traffic is emitted back).

The monitoring mode may be regarded as a subset of the controlling mode functionality where sending functions are disabled while the original traffic is left intact. Further, the user traffic is broken-out with the Ethernet tap 70 for monitoring purpose while the original traffic is left intact. The processing subsystem is then in listening mode only for maintaining various traffic statistics.

Figure 5:
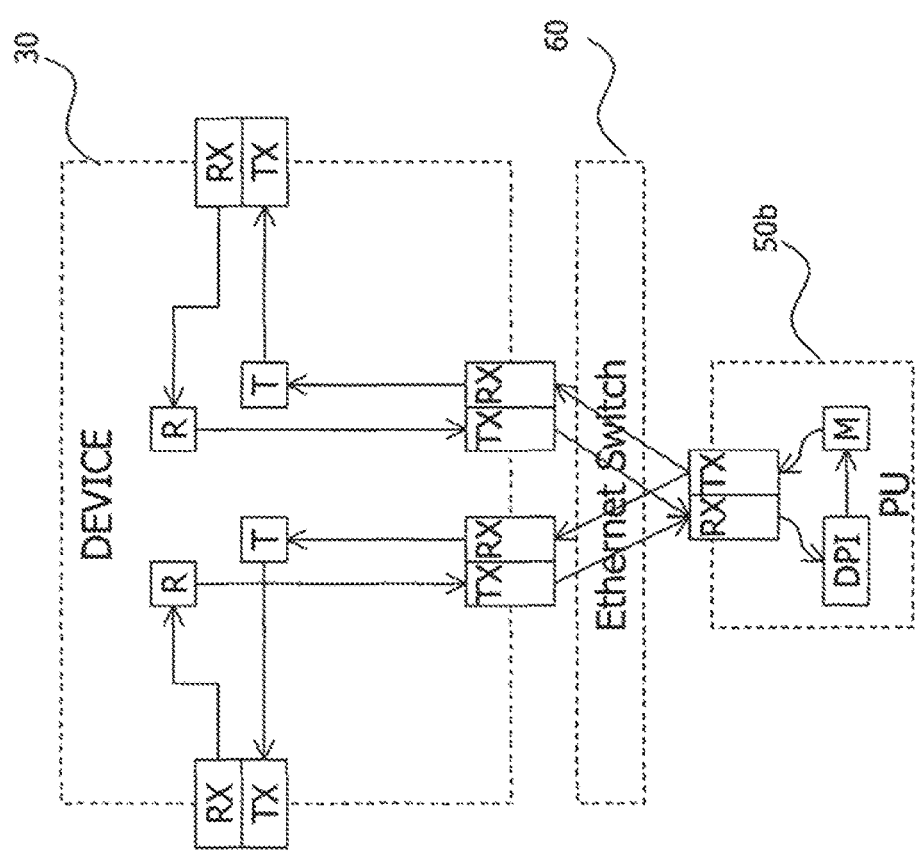
FIG. 5 is a schematic illustration of the operation of the first device embodiment of FIG. 1b.

FIG. 5 summarizes the first system embodiment of FIG. 1a, the first device embodiment of FIG. 1b as well as the second method embodiment of FIG. 2b (controlling mode). As shown in FIG. 5, in controlling mode, the traffic originated from the first node 10 enters the device 30 through an input RX port. In steps 202 to 206 (these steps are in the following summarized and referred to as R-FUNCTION), the device 30 performs the PU selection by rewriting the destination MAC address. The selected PU 50b then performs the controlling operation, e.g. the DPI task. Then, the processed packets are directed back to the appropriate RX port of the device 30 (this step similar to step 226 is referred to as the M-FUNCTION). The packets received by the device 30 from the PU 50b are handled such that they are directed to the second node 20 in steps 228 and 230 (these steps are in the following summarized and referred to as T-FUNCTION, which may be regarded as a next-hop selection). The processed packets then leave the system through the TX ports towards the original destination, the second node 20.

FIG. 5 also illustrates a redirecting operation in the opposite direction, i.e. from the second node 20 to the first node 10. In the opposite redirecting operation all steps are equivalently performed in the opposite direction.

Figure 6:
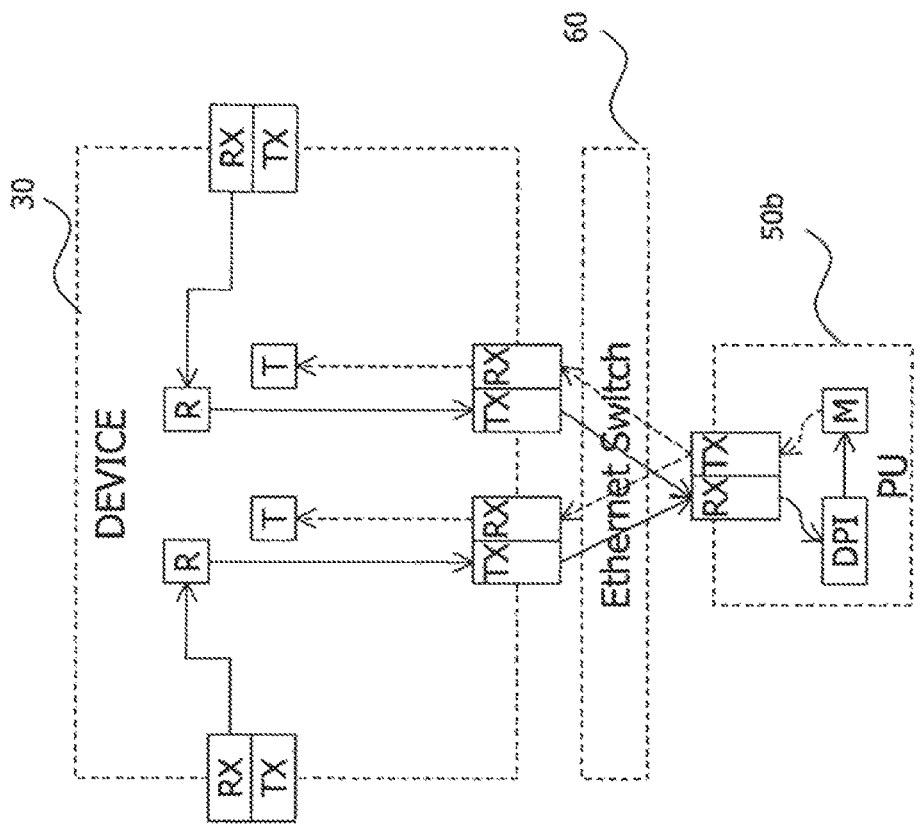
FIG. 6 is a schematic illustration of the operation of the second device embodiment of FIG. 3b.

FIG. 6 summarizes the second system embodiment of FIG. 3*a*, the second device embodiment of FIG. 3*b* as well as the fourth method embodiment of FIG. 4*b* (monitoring mode). In the monitoring mode, the traffic originated from the first node 10 is duplicated by the external Ethernet tap 70 and the duplicated traffic enters the device 30 through an input RX port. In steps 402, 406 and 408 (these steps are in the following summarized and referred to as R-FUNCTION), the device 30 performs the PU selection by rewriting the destination MAC address. Then, the packet is directed to the appropriate PU 50*b*. In the PU 50*b*, the packet is monitored for collecting statistical information about the traffic and is finally discarded.

In the monitoring mode, for blocking unwanted effects, the T-FUNCTION and the M-FUNCTION as set forth above with respect to FIG. 5 (controlling mode) may handle beacon frames. For example, each PU can report its load and implicitly its status or health in periodic beacon frames to the device 30. These beacon frames may thus provide feedback between the PU and the device 30, which preferably must not be forwarded to the second node 20. The T-function advantageously filters the beacon frames used for load status update and may discard it. This may be used in both controlling and monitoring mode. In the monitoring mode, the original packets are preferably not returned back to the device 30 and to the second node 20. in case some garbage traffic arrives from the PU direction at the device 30 (e.g. some switch reconfiguration occurred), the T-function will discard these packets. In the controlling mode, however, the T-function preferably forwards the returning packets to the second node 20.

As set forth above, the R-FUNCTION ensures that the tunnelled IP packets (frames) sent by the nodes via the input (RX) ports are directed to the output (TX) ports of the processing subsystem. In this respect, non-tunnelled frames may be directly passed to the T-FUNCTION to ensure transparency. In addition, the R-FUNCTION inspects the inner user IP header of the packet and rewrites the destination MAC address. The MAC addresses of the available PUs are automatically learnt using MAC learning. The R-FUNCTION may implement a stateful algorithm to ensure that subsequent packets of the same data session are directed to the same PU. In the dynamic mode, the lowest reported PU load indicator may be used to select the PU for each new data session. Overload protection is also feasible in that the excess traffic of new data sessions is directed immediately to the T-FUNCTION.

The T-FUNCTION may be equivalent to the Address Resolution Protocol (ARP) mechanism (the MAC address resolution) which restores the destination MAC address of the original destination based on the outer destination IP address. The T-FUNCTION ensures that the frames arriving back from the processing subsystem are directed to the appropriate outgoing (TX) port towards the nodes. It may also remove the beacon frames sent by the PUs and may update the list of available PUs for the R-FUNCTION.

Each PU implements the M-FUNCTION, which ensures that the frame is returned to the appropriate port of the device 30. This purpose is achieved by swapping the source and destination MAC addresses of the packets before transmission back to the device 30. Furthermore, the M-FUNCTION may inject beacon frames periodically to inform the device 30 on the availability, the MAC address of the PU and on the processing load of the PU.

Monitoring or controlling the tunnelled traffic has several benefits over the un-tunnelled traffic in 3GPP networks. For example, more factors can be incorporated for the decision. These include the bearer attributes, node location and several other parameters that are available from network signalling. This enables monitoring or controlling traffic for example at Gn, Iu, S1 interfaces of the 3GPP system.

The introduction of the device 30 enables efficient scaling of the monitoring or controlling subsystem for tunnelled user traffic beyond the capabilities of hardware to be used in a single chassis. Further, the port density and stackable design of modern Ethernet switches enable the processing subsystem to be built from many low-speed, inexpensive components (PUs).

The beacon based feedback mechanism ensures high-availability implementation of the processing subsystem and enables intelligent real-time overload protection at cost of reducing the data sessions to be inspected.

The construction of the device 30 enables media conversion between few expensive inter-node links (e.g. 10 Gbps Ethernet) and many inexpensive links (100/1000 Mbps Ethernet) of processing nodes. Furthermore, the one-to-one assignment of input and output ports ensures that there is no queuing and blocking within the device 30 and thus contribution to the latency and loss can be kept minimal.

What is claimed is:

1. A method for selecting a Processing Unit (PU) for traffic analysis from a plurality of PUs, the method comprising:

receiving Ethernet based tunneled Internet Protocol (IP) traffic, by a device, transmitted from a first network node towards a second network node of an IP communications network, the Ethernet based tunneled IP traffic comprising an Ethernet based tunneled IP packet, the Ethernet based tunneled IP packet comprising a header and a payload, the header containing a destination Ethernet address and the payload containing an inner use IP header of an inner user IP packet;

modifying, by an Ethernet Switch, the destination Ethernet address contained in the header of the Ethernet based tunneled IP packet based on the inner user IP header;

selecting one PU, from the plurality of PUs, for traffic analysis of a data session comprising the Ethernet based tunneled IP traffic;

copying the Ethernet based tunneled IP packet traffic comprising the Ethernet based tunneled IP packet transmitted from the first network node; and receiving, by the device, the copied Ethernet based tunneled IP traffic comprising the Ethernet based tunneled IP packet;

wherein the Ethernet based tunneled IP packet is to be redirected to the selected PU in accordance with the modified destination Ethernet address;

wherein the method further comprising monitoring the Ethernet based tunneled IP packet in the selected PU by performing a Deep Packet Inspection on the Ethernet based tunneled IP packet in the selected PU thereby to collect statistical information about the received Ethernet based tunneled IP packets; and discarding the Ethernet based tunneled IP packet in the selected PU, after the monitoring.

2. The method of claim 1:
wherein the header of the Ethernet based tunneled IP packet further comprises a Virtual Local Area Network (VLAN) tag indicating a logical separation of the plurality of PUs into two or more subsets of the plurality of PUs; and
wherein the selecting the PU for traffic analysis comprises selecting the PU for traffic analysis by considering the VLAN tag.

3. The method of claim 1, wherein the Ethernet based tunneled IP packet is processed in the selected PU, and further comprising:
receiving, by the device, the processed Ethernet based tunneled IP packet;
restoring, by the device, the original destination Ethernet address contained in the Ethernet based tunneled IP packet; and
directing, by the device, the processed Ethernet based tunneled IP packet to the second network node in accordance with the restored original destination Ethernet address.

4. The method of claim 3, wherein the Ethernet based tunneled IP packet is modified by being processed in the selected PU.

5. The method of claim 3, wherein the Ethernet based tunneled IP packet is filtered by being processed in the selected PU.

6. The method of claim 3, wherein the Ethernet based tunneled IP packet is deliberately delayed by being processed in the selected PU.

7. The method of claim 1, further comprising redirecting, by a redirecting component, the Ethernet based tunneled IP traffic comprising the Ethernet based tunneled IP packet to the selected PU in accordance with the modified destination Ethernet address.

8. The method of claim 1, further comprising automatically learning a plurality of destination Ethernet addresses, wherein each destination Ethernet address corresponds to one of the plurality of PUs.

9. A device for selecting a Processing Unit (PU) for traffic analysis from a plurality of PUs, the device comprising:
receiving circuitry configured to receive Ethernet based tunneled Internet Protocol (IP) traffic comprising an Ethernet based tunneled IP packet transmitted from a first network node towards a second network node of an IP communications network, the Ethernet based tunneled IP traffic packet comprising a header and a payload, the header containing a destination Ethernet address and the payload containing an inner use IP header of an inner user IP packet;
modifying circuitry configured to modify the destination Ethernet address contained in the header of the Ethernet based tunneled IP packet on the basis of the inner user IP header;
selecting circuitry configured to select one PU, from the plurality of PUs, for traffic analysis of a data session comprising the Ethernet based tunneled IP traffic;
copying circuitry configured to copy the Ethernet based tunneled IP packet traffic comprising the Ethernet based tunneled IP packet transmitted from the first network node; and
receiving circuitry configured to receive the copied Ethernet based tunneled IP traffic comprising the Ethernet based tunneled IP packet;
wherein the Ethernet based tunneled IP packet is to be redirected to the selected PU in accordance with the modified destination Ethernet address;

wherein the selected PU is configured for monitoring the Ethernet based tunneled IP packet by performing a Deep Packet Inspection on the Ethernet based tunneled IP packet thereby to collect statistical information about the received Ethernet based tunneled IP packets; and configured to discard the Ethernet based tunneled IP packet in the selected PU, after the monitoring the Ethernet based tunneled IP packet in the selected PU;
wherein the receiving, modifying, selecting and copying circuitry are comprised in one or more processing circuits of the device.

10. The device of claim 9, wherein the modifying circuitry is configured to:
read the inner user IP header of the inner user IP packet; and
modify the destination Ethernet address contained in the header of the Ethernet based tunneled IP packet based on the read inner user IP header.

11. The device of claim 9, further comprising:
restoring circuitry configured to restore the original destination Ethernet address contained in the Ethernet based tunneled IP packet; and
directing circuitry configured to direct the Ethernet based tunneled IP packet to the second network node in accordance with the restored original destination Ethernet address.

12. The device of claim 9, further comprising learning circuitry configured to automatically learn a plurality of destination Ethernet addresses, each destination Ethernet address corresponding to one of the plurality of PUs.

13. A system for redirecting Ethernet based tunneled Internet Protocol (IP) traffic in an IP communication network, the system comprising a device comprising:
receiving circuitry configured to receive Ethernet based tunneled Internet Protocol (IP) traffic comprising an Ethernet based tunneled IP packet transmitted from a first network node towards a second network node of the IP communications network, the Ethernet based tunneled IP traffic packet including a header and a payload, the header containing a destination Ethernet address and the payload containing an inner use IP header of an inner user IP packet;
modifying circuitry configured to modify the destination Ethernet address contained in the header of the Ethernet based tunneled IP packet on the basis of the inner user IP header;
selecting circuitry configured to select one PU, from the plurality of PUs, for traffic analysis of a data session comprising the Ethernet based tunneled IP traffic;
copying circuitry configured to copy the Ethernet based tunneled IP packet traffic comprising the Ethernet based tunneled IP packet transmitted from the first network node;
wherein the receiving circuitry configured to receive the copied Ethernet based tunneled IP traffic comprising the Ethernet based tunneled IP packet;
wherein the Ethernet based tunneled IP packet is to be redirected to the selected PU in accordance with the modified destination Ethernet address;
wherein the selected PU is configured for monitoring the Ethernet based tunneled IP packet by performing a Deep Packet Inspection on the Ethernet based tunneled IP packet thereby to collect statistical information about the received Ethernet based tunneled IP packets; and configured to discard the Ethernet based tunneled IP packet in the selected PU, after the monitoring the Ethernet based tunneled IP packet in the selected PU;

wherein the receiving, modifying, selecting and copying circuitry are comprised in one or more processing circuits of the device; and an Ethernet Switch comprising one or more processing circuits configured to redirect the Ethernet based tunneled IP traffic comprising the Ethernet based tunneled IP packet to the selected PU in accordance with the modified destination Ethernet address.

14. The system of claim 13:

further comprising the plurality of PUs configured to analyze the redirected Ethernet based tunneled IP traffic comprising the Ethernet based tunneled IP packet using the selected PU, wherein each of the plurality of PUs are configured to support at least one of:

monitoring the redirected Ethernet based tunneled IP packet; or processing the redirected Ethernet based tunneled IP.

15. The system of claim 14, wherein the selected PU is adapted to process the redirected Ethernet based tunneled IP traffic comprising the Ethernet based tunneled IP packet by performing at least one of modifying, filtering, or delaying the redirected Ethernet based tunneled IP packet.

16. The system of claim 13, wherein the copying circuitry is an Ethernet tap or an Ethernet switch port mirroring device.

* * * * *